United States Patent
Savian et al.

(10) Patent No.: US 9,428,259 B2
(45) Date of Patent: Aug. 30, 2016

(54) BI-FOLD DOOR MODULE

(71) Applicant: C&D ZODIAC, INC., Huntington Beach, CA (US)

(72) Inventors: Scott Savian, Huntington Beach, CA (US); Eric Long, Huntington Beach, CA (US); Ian Geoffrey Scoley, Huntington Beach, CA (US); Glen Noda, Huntington Beach, CA (US); William Young, Huntington Beach, CA (US); Richard McClure, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 15/067,097

(22) Filed: Mar. 10, 2016

(65) Prior Publication Data

US 2016/0194068 A1    Jul. 7, 2016

Related U.S. Application Data

(63) Continuation-in-part of application No. 14/670,016, filed on Mar. 26, 2015.

(60) Provisional application No. 62/054,299, filed on Sep. 23, 2014, provisional application No. 61/971,495, filed on Mar. 27, 2014.

(51) Int. Cl.
*E06B 3/32* (2006.01)
*B64C 1/14* (2006.01)
(Continued)

(52) U.S. Cl.
CPC ............. *B64C 1/1407* (2013.01); *B64D 11/02* (2013.01); *E06B 3/4636* (2013.01); *E06B 3/481* (2013.01)

(58) Field of Classification Search
CPC ........... E06B 3/805; E06B 3/94; E05D 1/06; B64C 1/1407; B64C 1/1461; B64C 1/1469
USPC ........................................ 160/213, 206, 199
See application file for complete search history.

(56) References Cited

U.S. PATENT DOCUMENTS

| | | |
|---|---|---|
| 1,726,794 A | 9/1929 | Anetsberger |
| 2,208,166 A | 7/1940 | Sherron |

(Continued)

FOREIGN PATENT DOCUMENTS

| | | |
|---|---|---|
| EP | 0631030 | 12/1994 |
| JP | 8218740 | 8/1996 |

(Continued)

OTHER PUBLICATIONS

PCT/US2015/022522 International Search Report & Written Opinion dated Jun. 25, 2015.

(Continued)

*Primary Examiner* — Katherine Mitchell
*Assistant Examiner* — Johnnie A Shablack
(74) *Attorney, Agent, or Firm* — Jeffer Mangels; Butler & Mitchell LLP; Brennan C. Swain, Esq.

(57) ABSTRACT

A door module for a vehicle lavatory that includes a bi-fold door having a first panel and a second panel each having an inner surface and an outer surface. The first and second panels are pivotably connected together by a living hinge. The living hinge includes a hinge member that extends between first and second securing members, wherein the first securing member extends along and is attached to an inner edge of the first panel and the second securing member extends along and is attached to an inner edge of the second panel.

21 Claims, 20 Drawing Sheets

(51) Int. Cl.
*E06B 3/48* (2006.01)
*E06B 3/46* (2006.01)
*B64D 11/02* (2006.01)

(56) References Cited

U.S. PATENT DOCUMENTS

| | | | |
|---|---|---|---|
| 2,333,312 A | 11/1943 | Grinstead | |
| 2,530,263 A | 11/1950 | Peremi | |
| 2,713,897 A | 7/1955 | Teague | |
| 2,980,919 A | 4/1961 | Otto et al. | |
| 3,070,856 A | 1/1963 | Minick | |
| 3,161,923 A | 12/1964 | Crain | |
| 3,178,070 A | 4/1965 | Leland | |
| 3,390,418 A | 7/1968 | Sheridan | |
| 3,400,749 A | 9/1968 | Smith | |
| 3,605,854 A | 9/1971 | Majeske | |
| 3,646,634 A | 3/1972 | Fusselman | |
| 3,742,554 A | 7/1973 | Houtman | |
| 3,861,445 A | 1/1975 | Schwindt | |
| 3,949,801 A | 4/1976 | Sasaki | |
| 3,996,860 A | 12/1976 | Ravani | |
| 4,191,412 A | 3/1980 | LeKander | |
| 4,276,919 A | 7/1981 | Walters | |
| 4,296,791 A | 10/1981 | Chaumat | |
| 4,341,255 A * | 7/1982 | Mock | E06B 3/28 160/368.1 |
| 4,620,581 A | 11/1986 | Wallace | |
| 4,679,277 A | 7/1987 | Shibata | |
| 4,711,046 A * | 12/1987 | Herrgord | G09F 15/0068 160/135 |
| 4,785,565 A | 11/1988 | Kuffner | |
| 4,805,263 A | 2/1989 | Kurtz | |
| 4,848,436 A | 7/1989 | Dagenais | |
| 5,000,614 A | 3/1991 | Walker et al. | |
| 5,074,009 A | 12/1991 | Simonton | |
| 5,080,160 A | 1/1992 | Gephart | |
| 5,085,261 A | 2/1992 | Bortoluzzi | |
| 5,329,667 A | 7/1994 | Erskine | |
| 5,339,576 A | 8/1994 | Fussler | |
| 5,355,554 A | 10/1994 | Magoon | |
| 5,379,821 A | 1/1995 | Pergolizzi | |
| 5,435,372 A | 7/1995 | Kikuchi | |
| 5,486,391 A | 1/1996 | Tyner | |
| 5,502,930 A | 4/1996 | Burkette | |
| 5,524,941 A | 6/1996 | Fleming | |
| 5,553,354 A | 9/1996 | Trulaske, Sr. | |
| 5,704,100 A | 1/1998 | Swan | |
| 5,724,771 A | 3/1998 | Gipson | |
| 5,782,282 A | 7/1998 | Chen | |
| 5,816,309 A | 10/1998 | Paradise | |
| 5,920,956 A | 7/1999 | Salice | |
| 6,178,844 B1 | 1/2001 | Burger | |
| 6,253,826 B1 * | 7/2001 | Witter | E06B 3/481 160/213 |
| 6,357,806 B1 | 3/2002 | Saku | |
| 6,381,904 B1 | 5/2002 | Tedescucci | |
| 6,382,750 B1 | 5/2002 | King | |
| 6,435,253 B1 | 8/2002 | Steeves | |
| 6,789,601 B2 | 9/2004 | Rooth | |
| 7,051,780 B2 | 5/2006 | Csik | |
| 7,089,627 B2 * | 8/2006 | Seidler | B65D 51/04 16/320 |
| 7,370,685 B2 | 5/2008 | Moriya | |
| 7,774,991 B2 | 8/2010 | Fletcher | |
| 7,861,374 B2 * | 1/2011 | Verdicchio | E05D 1/02 16/225 |
| 8,096,341 B2 | 1/2012 | Teunissen | |
| 8,167,386 B2 | 5/2012 | Bergesch | |
| 8,671,633 B2 | 3/2014 | Haab | |
| 8,684,307 B2 | 4/2014 | Yoshizaki | |
| 8,726,578 B2 | 5/2014 | Thielke | |
| 8,819,993 B1 | 9/2014 | Chen | |
| 9,062,484 B2 | 6/2015 | Miller | |
| 2005/0241781 A1 | 11/2005 | Johnson | |
| 2007/0029460 A1 | 2/2007 | Fitzler et al. | |
| 2007/0094846 A1 | 5/2007 | Ishida | |
| 2009/0008927 A1 | 1/2009 | Binder et al. | |
| 2009/0133571 A1 * | 5/2009 | Pfister | F41H 7/04 89/36.07 |
| 2009/0152879 A1 | 6/2009 | Pala | |
| 2009/0179111 A1 | 7/2009 | Ebner et al. | |
| 2009/0293242 A1 | 12/2009 | Bithell et al. | |
| 2010/0012280 A1 | 1/2010 | Hans | |
| 2010/0237193 A1 * | 9/2010 | Yoshizaki | B64C 1/1407 244/129.5 |
| 2010/0303542 A1 * | 12/2010 | Costabel | F16B 5/0628 403/326 |
| 2011/0000011 A1 | 1/2011 | Gebka | |
| 2011/0005691 A1 | 1/2011 | Schneider | |
| 2011/0011003 A1 | 1/2011 | Vogel | |
| 2011/0203179 A1 | 8/2011 | Boens | |
| 2011/0215199 A1 | 9/2011 | Lee | |
| 2013/0146232 A1 | 6/2013 | Swoboda et al. | |
| 2014/0231031 A1 | 8/2014 | Chen | |
| 2014/0366321 A1 | 12/2014 | Chen | |
| 2015/0330126 A1 | 11/2015 | Ma | |
| 2016/0032615 A1 | 2/2016 | Koyama | |
| 2016/0083092 A1 * | 3/2016 | Long | B64C 1/1469 160/213 |

FOREIGN PATENT DOCUMENTS

| | | |
|---|---|---|
| JP | 3057092 | 6/2000 |
| JP | 2001173319 | 6/2001 |
| JP | 2010077709 | 4/2010 |

OTHER PUBLICATIONS

PCT/US2015/022553 International Search Report & Written Opinion dated Aug. 28, 2015.
PCT/US2015/022768 International Search Report & Written Opinion dated Jul. 2, 2015.

* cited by examiner

BI-FOLD DOOR MODULE

CROSS REFERENCE TO RELATED APPLICATIONS

This application is a continuation-in-part of U.S. patent application Ser. No. 14/670,016, filed Mar. 26, 2015, which claims the benefit of U.S. Provisional Application No. 62/054,299, filed Sep. 23, 2014 and U.S. Provisional Application No. 61/971,495, filed Mar. 27, 2014, which are all incorporated by reference herein in their entireties.

FIELD OF THE INVENTION

The present invention relates generally to a door module, and more particularly to a door module for use with a lavatory module in an aircraft.

BACKGROUND OF THE INVENTION

Commercial aircraft, such as the Airbus A320 or Boeing 737, are typically constructed from modular components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew that include a door on one of the walls thereof. Opening a bi-fold door can often be tricky. The present invention helps make the opening of a bi-fold door more intuitive and obvious. This is achieved by providing a large paddle handle that, due to its shape, is effective at communicating to a user the function of the door as it is intuitive where to place one's hand and to pull instead of push. This, together with other advantages of the door module, is discussed below.

SUMMARY OF THE PREFERRED EMBODIMENTS

In accordance with a first aspect of the present invention there is provided a door module for a vehicle lavatory that includes a bi-fold door having a first panel and a second panel each having an inner surface and an outer surface. The first and second panels are pivotably connected together by a living hinge. The living hinge includes a hinge member that extends between first and second securing members, wherein the first securing member extends along and is attached to an inner edge of the first panel and the second securing member extends along and is attached to an inner edge of the second panel. In a preferred embodiment, the hinge member includes opposite edges, the first and second securing members each include an elongated groove defined therein, and the elongated grooves capture the opposite edges of the hinge member. Preferably, the door module also includes a latching assembly positioned in the first panel. The latching assembly operates an elongated locking bolt, the first securing member includes a first tunnel defined therein, and the locking bolt extends through and above the first tunnel. Preferably, the first securing member includes a latch opening defined therein that is communication with the first tunnel, and a portion of the latching assembly extends through the latch opening and into the first tunnel.

In a preferred embodiment, the bi-fold door is positioned in a door opening that is defined in a wall and is movable between a closed position and an open position. The outer edge of the first panel includes a first nesting member thereon, an inner edge of the wall adjacent the outer edge of the first panel includes a second nesting member thereon, and at least a portion of the first and second nesting members overlap in a transverse direction when the bi-fold door is in the closed position. Preferably, the first nesting member includes a non-engagement portion and an engagement portion, the second nesting member includes a non-engagement portion and an engagement portion, and when a force is placed on the inner surface of the first panel, the engagement portion of the first nesting member contacts the engagement portion of the second nesting member to prevent the bi-fold door from opening. Preferably, the non-engagement portion of the first nesting member is generally parallel to the outer edge of the first panel, and the non-engagement portion of the second nesting member is generally parallel to the inner edge of the wall.

In a preferred embodiment, an outer paddle handle is secured to and extends outwardly from the first panel such that it overlaps at least a portion of the wall and an inner paddle handle is secured to the second panel and overlaps at least a portion of the first panel (and/or the living/central hinge). Preferably, the wall includes a handle indentation defined therein, and the outer paddle handle overlaps and cooperates with the handle indentation to define an opening space. Preferably, an insert is positioned in the handle indentation, and the insert includes a ramp portion leading into and partially defining the opening space. In a preferred embodiment, the outer edge of the second panel includes an edge cap secured thereto that includes a tunnel extending therethrough. An upper hinge member is positioned in the tunnel such that an upper hinge pin extends above the edge cap, and a lower hinge member is positioned in the tunnel such that a lower hinge pin extends below the edge cap.

In accordance with another aspect of the present invention there is provided a door module for a vehicle lavatory that includes a wall that includes a door opening defined therein, and a bi-fold door positioned in the door opening and movable between a closed position and an open position. The bi-fold door includes a first panel and a second panel each having an inner surface and an outer surface and that are pivotably connected together by a living hinge. The living hinge includes a hinge member that extends between first and second securing members. The first securing member extends along and is attached to an inner edge of the first panel and the second securing member extends along and is attached to an inner edge of the second panel. The hinge member includes opposite edges, the first and second securing members each include an elongated groove defined therein, and the elongated grooves capture the opposite edges of the hinge member. The outer edge of the first panel includes a first nesting member thereon, an inner edge of the wall adjacent the outer edge of the first panel includes a second nesting member thereon, and at least a portion of the first and second nesting members overlap in a transverse or lateral direction when the bi-fold door is in the closed position. An outer paddle handle is secured to and extends outwardly from the first panel such that it overlaps at least a portion of the wall, and an inner paddle handle is secured to the second panel and overlaps at least a portion of the first panel.

In a preferred embodiment, the door includes a living hinge as the central hinge. Preferably, the living hinge includes cold extruded plastic and rubber. In a preferred embodiment, the leading edge of the door and door jamb are interlocking or complementary. Preferably, the door jamb includes a groove or curved surface that the leading edge of the door fits into. In use, when the door closes, the leading edge is moving toward the jamb (translating), but is also turning. This motion is captured by the interlocking of the door and the door jamb, as described herein. Preferably, the interlocking surfaces are part of extrusions that are secured to the door and the door jamb. This interlocking provides security to someone using the lavatory and helps prevent the door from being pushed open when the lavatory is being used.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
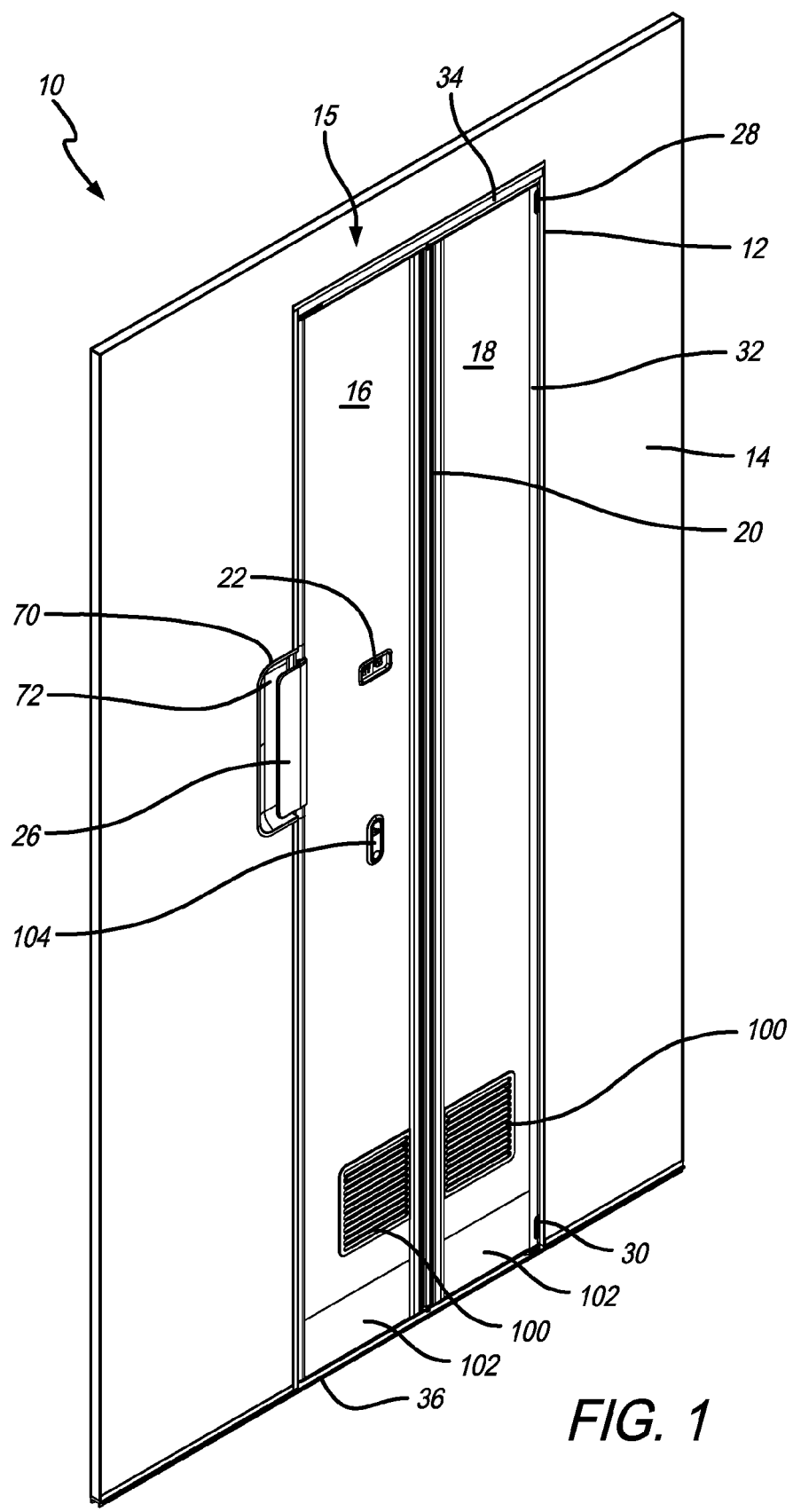
FIG. 1 is an outer perspective view of a door module and wall panel in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

FIGS. 1-9 show a door module 10 positioned within a door opening 12 in a wall 14. In a preferred embodiment, the door module 10 is used in an aircraft lavatory. However, this is not a limitation on the present invention and the door module 10 can be used in other locations. As shown in the drawings, in a preferred embodiment, the door module 10 generally includes a bi-fold door 15 that includes a first panel 16 and a second panel 18 that are secured together and pivotable with respect to one another via a central hinge 20. Preferably, the central hinge 20 is a living hinge (described below). However, this is not a limitation on the present invention and the center hinge can also be any other type of known hinge. The door module 10 also includes a latching assembly 22, an inner handle 24, an outer handle 26, upper and lower hinge members 28 and 30, a doorframe edge cap 32, header assembly 34, lower closeout 36, and upper and lower trim 38 and 40. The door module 10 can include other components known in the art such as vents 100, kick plates 102, an ashtray 104, door damper 106, etc.

Figure 2:
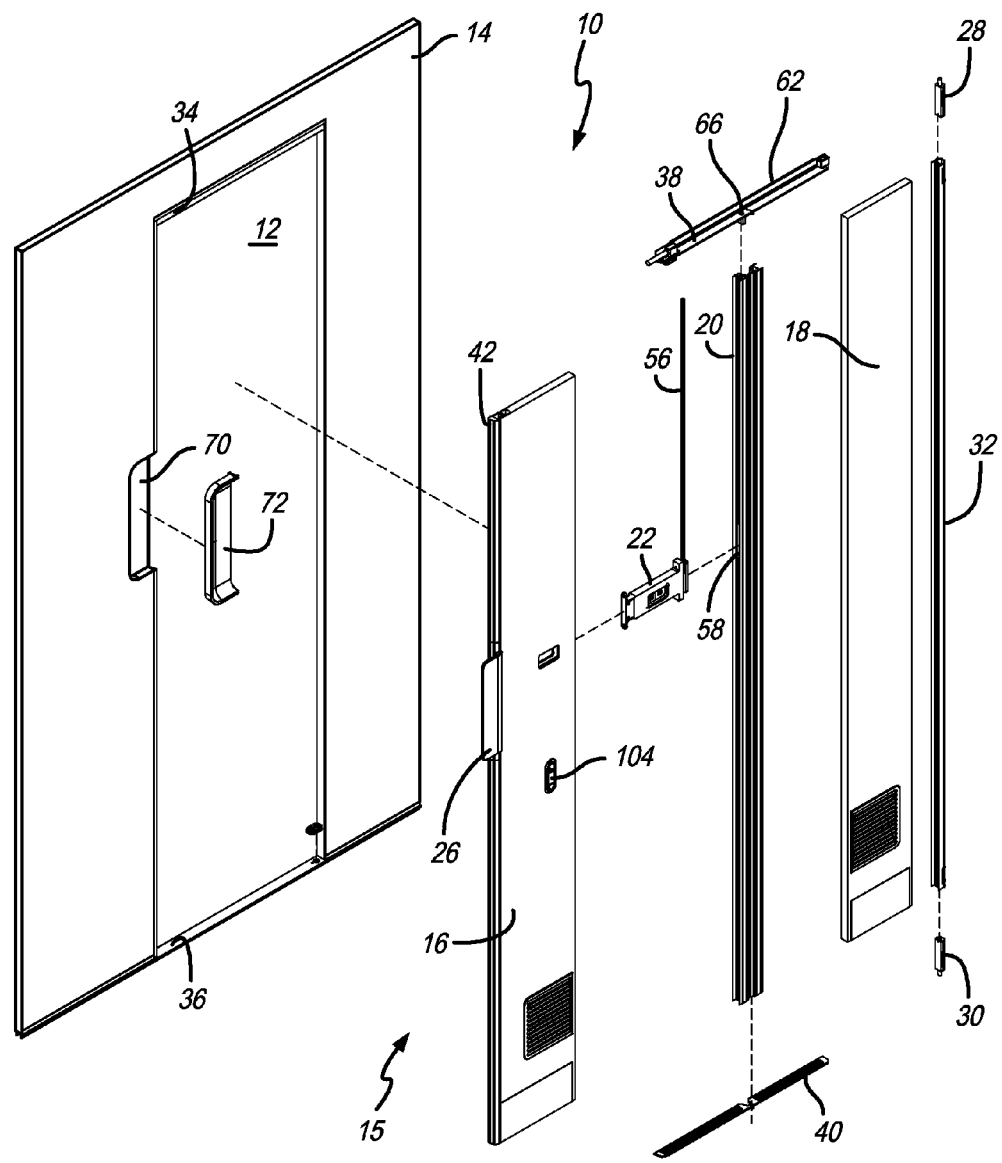
FIG. 2 is an exploded perspective view of the door module of FIG. 1.
Figure 3:
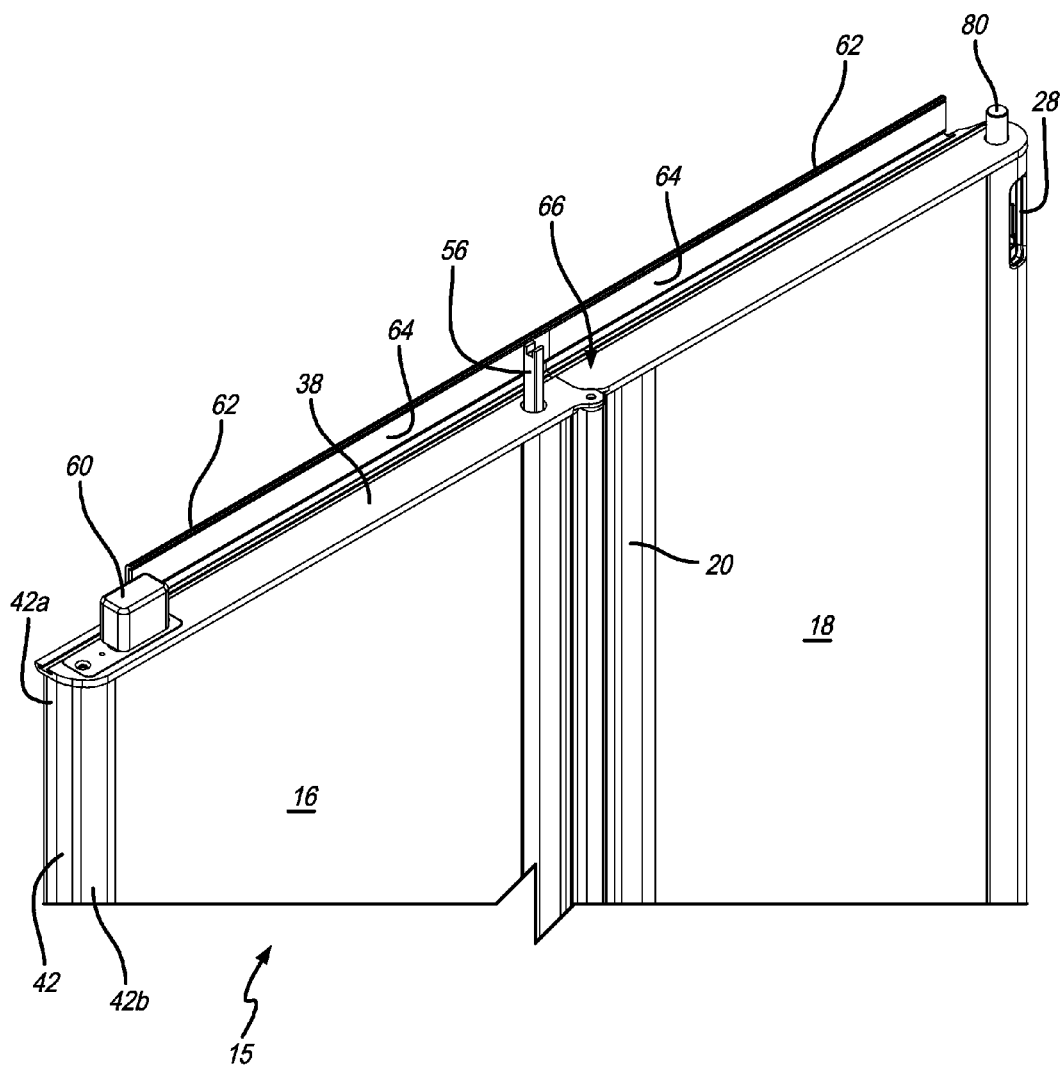
FIG. 3 is a perspective view of the top portion of the door module of FIG. 1.

As shown in FIGS. 2-3, in a preferred embodiment, the upper portion of the bi-fold door 15 includes a track guide 60 extending upwardly from the first panel 16 and the upper trim 38. The track guide 60 moves or slides within a track in the header assembly 34 that is secured to the lower edge of the door opening 12 in the wall 14. The track guide 60 is positioned such that when the bi-fold door 15 moves between the open and closed positions, the leading edge of the door moves in a path shown in FIG. 5 and discussed further below. In a preferred embodiment, the upper portion of the bi-fold door 15 also includes a flange 62 having a magnet strip 64 thereon that interacts with a magnet strip on the header assembly 34. This helps finish the closing of the door when it is moved to the closed position.

Figure 4:
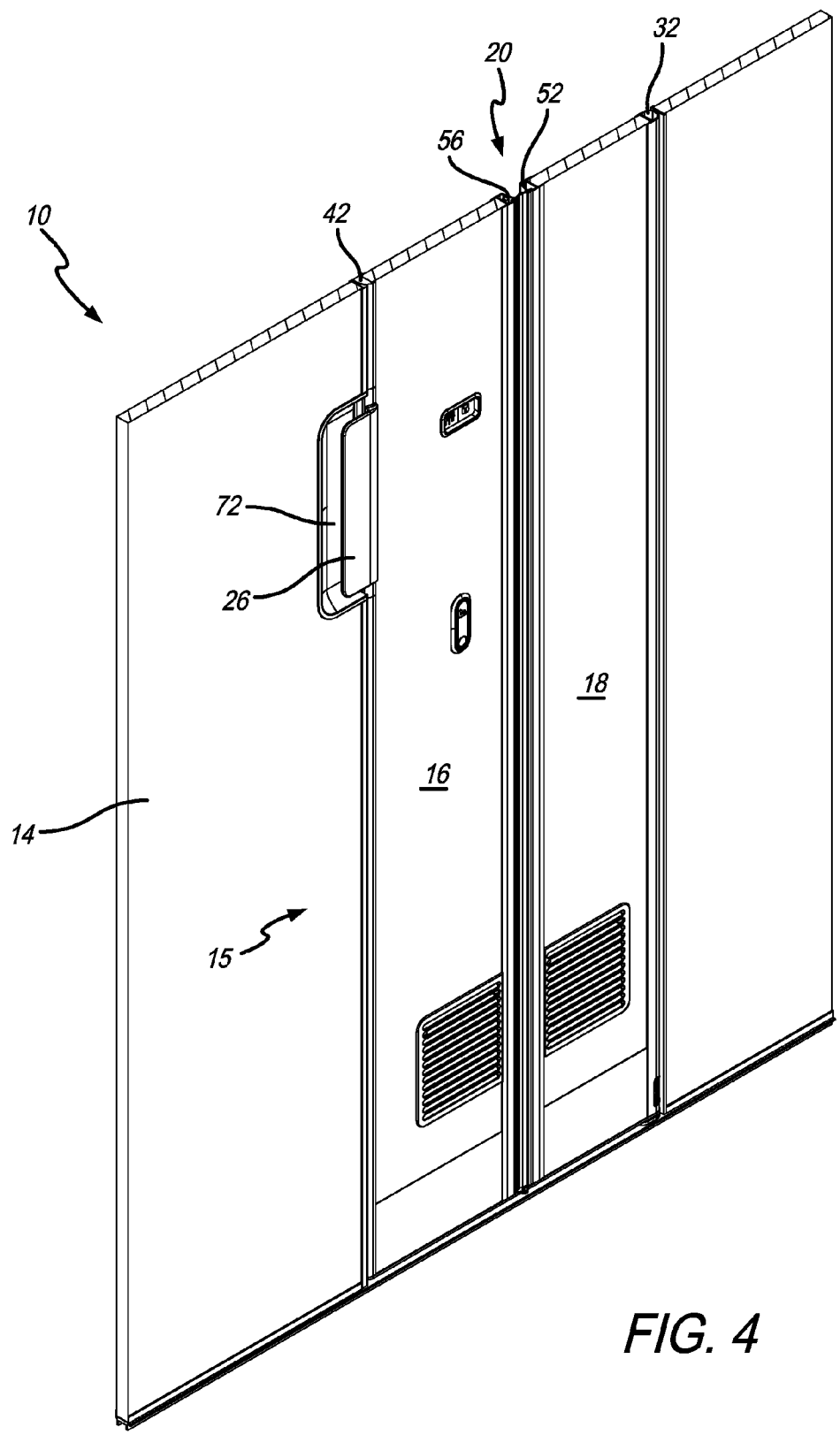
FIG. 4 is a cross-sectional perspective view of the top portion of the door module of FIG. 1.
Figure 5:
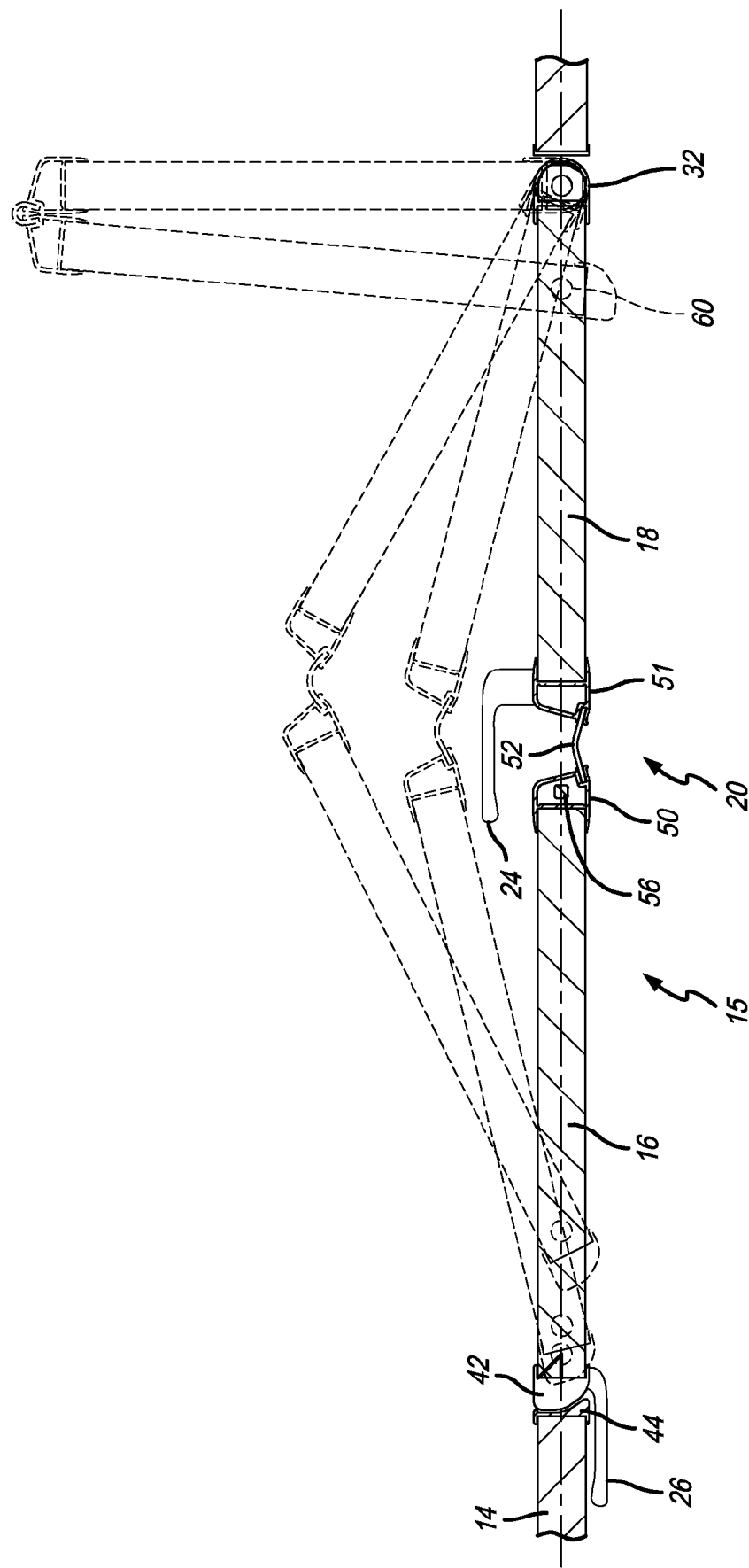
FIG. 5 is a cross-sectional plan view of the door module that shows the door moving between the open position and the closed position.
Figure 5A:
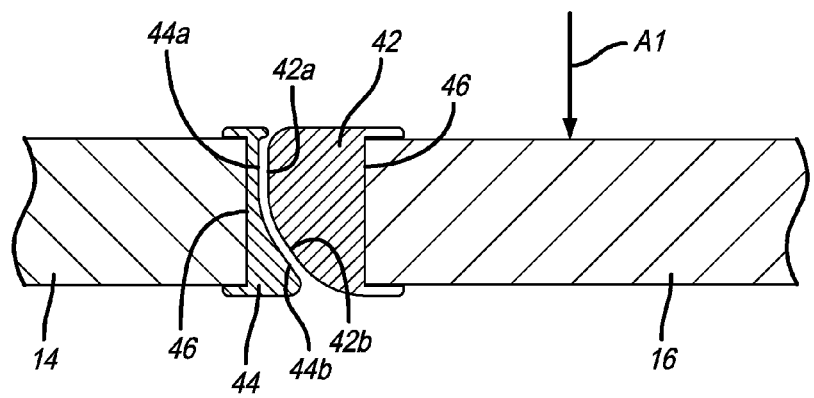
FIG. 5A is a detailed view of the interlocking feature of FIG. 5.

As shown in FIGS. 4-5A, in a preferred embodiment, the leading edge of the bi-fold door 15 interlocks or nests within the door jamb when the bi-fold door 15 is in the closed position. To accomplish this, the first panel 16 includes a first nesting member 42 secured thereon that interlocks with a second nesting member 44 that is secured to the wall 14. The first and second nesting members 42 and 44 can extend the entire height of the door 15 or, as shown in the drawings, there can be upper and lower portions that extend above and below the outer handle 26. The first and second nesting members 42 and 44 each include a channel 46 into which the first panel 16 or wall 14 are received. In a preferred embodiment, the first and second nesting members 42 and 44 are extrusions and are secured to (via adhesive, screws, fasteners, etc.) to the first panel 16 and wall 14. In another embodiment, the first nesting member can be integral with the first panel and the second nesting member can be integral with the wall.

It will be appreciated by those of ordinary skill in the art that the interlocking feature of the first and second nesting members helps prevent the door from being opened when the door (and, in particular, the first panel) is pushed from the inside (see arrow A1) in FIG. 5A. In a preferred embodiment, the first nesting member 42 includes a non-engagement portion or surface 42a and an engagement portion or surface 42b. The non-engagement portion 42a is generally parallel to the outer edge of the first panel 16 (or generally perpendicular to the front and back surfaces of the door). The engagement portion 42b curves or angles away from the non-engagement portion. The second nesting member 44 also includes a non-engagement portion 44a and an engagement portion 44b. The non-engagement portion 44a is generally parallel to the inner edge of the wall 14 (or generally perpendicular to the front and back surfaces of the wall), and is generally parallel to the non-engagement portion 42a of the first nesting member 42. The non-engagement portions can also be described as ramp portions. When a force is placed on the door 15 in the direction of arrow A1, the first panel 16 moves outwardly and engagement portion 42b contacts engagement portion 44b, thereby preventing the door from opening. Generally, the overlap between the first and second nesting members 42 and 44 in the lateral and/or transverse directions of the door 15 provides the interlocking capability. In other words, the profile of the leading edge of the door and the mating part on the wall or structure are shaped in a fashion that they will securely retain the door from any inboard outboard movement. They also eliminate any direct line of site through the gaps, preventing any unwanted light bleed and privacy issues.

It will be appreciated that the path traveled by the leading edge of the door, as a result of the interaction between track guide 60 and its track is what allows the first and second nesting members 42 and 44 to nest. This path is shown in FIG. 5 with reference to the various positions of the door shown in hidden lines and the path the track guide 60 must travel within the track.

Figure 5B:
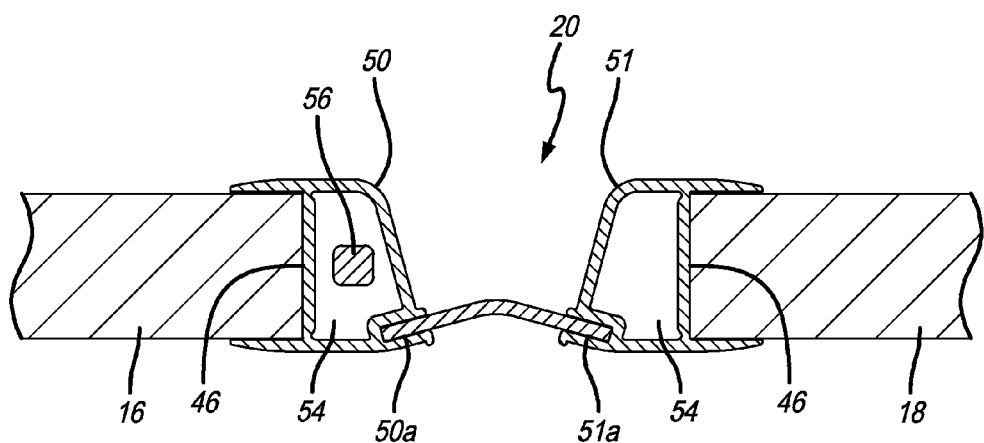
FIG. 5B is a detailed view of the living hinge of FIG. 5.

As shown in FIGS. 4 and 5B, in a preferred embodiment, the central hinge 20 is or includes a living hinge that connects the first and second panels 16 and 18. In a preferred embodiment, the living hinge includes a hinge member 52 that extends between first and second securing members 50 and 51. The first securing member 50 extends along and is attached to an inner edge of the first panel 16 and the second securing member 51 extends along and is attached to an inner edge of the second panel 18. The hinge member 52 includes opposite edges that are captured in grooves 50a and 51a defined in the first and second securing members 50 and 51. In a preferred embodiment, the hinge member 52 is made of a material that provides hinging or pivot capability, and also allows it to be biased toward the closed position (thereby making it easier for a user to close the door). For example, the hinge member 52 can be made of an elastomeric material or the like.

Preferably, the first and second securing members 50 and 51 each include a cavity or tunnel 54 extending therethrough. Furthermore, as described below, an elongated bolt 56 that is operationally associated with the latching assembly 22 extends through and is movable within the tunnel 54 of the one or the other of the first and second securing members 50 and 51.

In a preferred embodiment, the latching assembly 22 is positioned in the first panel and operates the elongated locking bolt 56. Preferably, the first securing member includes a latch opening 58 defined therein that is in communication with the tunnel 54, and a portion of the latching assembly 22 extends through the latch opening 58 and into the tunnel 54. In a preferred embodiment, the central hinge 20 includes a fixed hinge, pivot point or knuckle 66 at the top and bottom thereof. The fixed hinge 66 can be part of the upper trim 38 and captures and secures the top of the living hinge (the same is at the bottom).

As shown in FIG. 2, in a preferred embodiment, the latching assembly 22 interacts with the elongated bolt or locking mechanism 56. The single action bolt runs through the tunnel or cavity in the first securing member of the central hinge extrusion and extends through an opening in the upper trim 38. The top of the bolt moves between a released and locking position. In the locking position, the bolt extends into a receptacle or the like in the header assembly 34, wall or structure, thereby preventing the door 15 from being opened. The drawings show a latching assembly or mechanism 22 that is operated by a user in a horizontal manner, which in turn moves the bolt up and down. However, in another embodiment, the latching assembly can be operated in a vertical manner. In another embodiment, the latching mechanism can move a bolt that interacts horizontally with the vertical edge of the wall 14. By bolting the panel or blade of the bi-fold door 15 to the header 34, and in conjunction with the interlocking leading edge, the door is securely locked.

Figure 6:
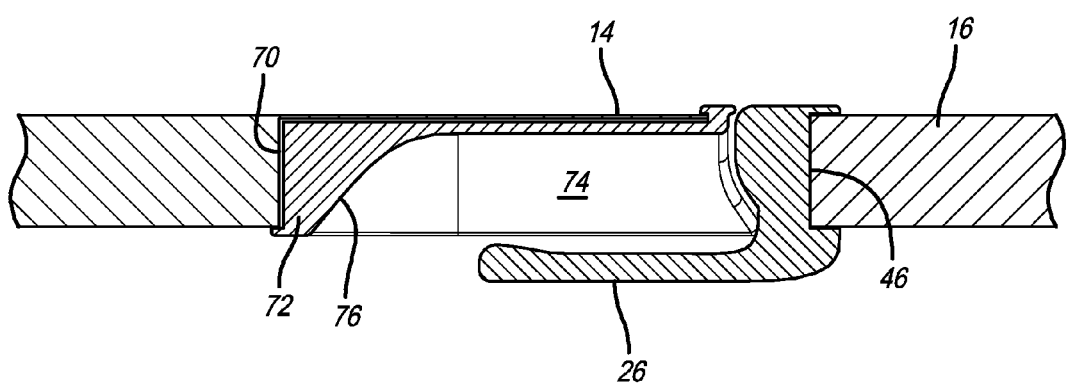
FIG. 6 is a cross-sectional plan view of the outer handle.

As shown in FIG. 5-6, in a preferred embodiment, the door 15 includes the outer paddle handle 26 that is secured to and extends outwardly from the first panel 16 such that it overlaps at least a portion of the wall 14. Preferably, the door 15 also includes the inner paddle handle 24 that is secured to the second panel 18 and overlaps at least a portion of the first panel 16. In another embodiment, the inner paddle handle 24 can be secured to the first panel 16 and overlap at least a portion of the second panel 16. The positioning of the handles makes it intuitive for someone inside or outside the bathroom as to where and how to pull on the handle. As shown in FIG. 2, in a preferred embodiment, the wall 14 includes a handle indentation 70 defined therein that includes an insert 72 positioned therein. The outer paddle handle 26 overlaps and cooperates with the handle indentation 70 and the insert 72 to define an opening space 74. Preferably, the insert 72 includes a ramp portion 76 leading into and partially defining the opening space 74.

Figure 7:
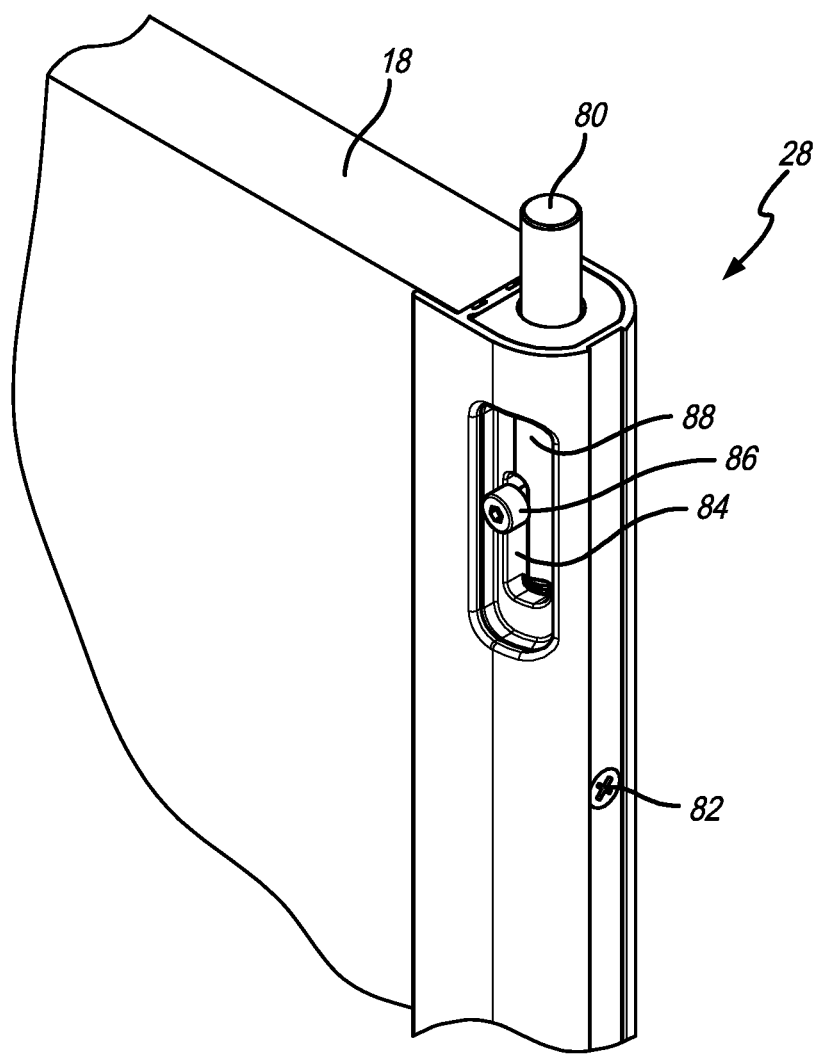
FIG. 7 is a perspective view of the upper hinge assembly of the door module of FIG. 1.
Figure 8:
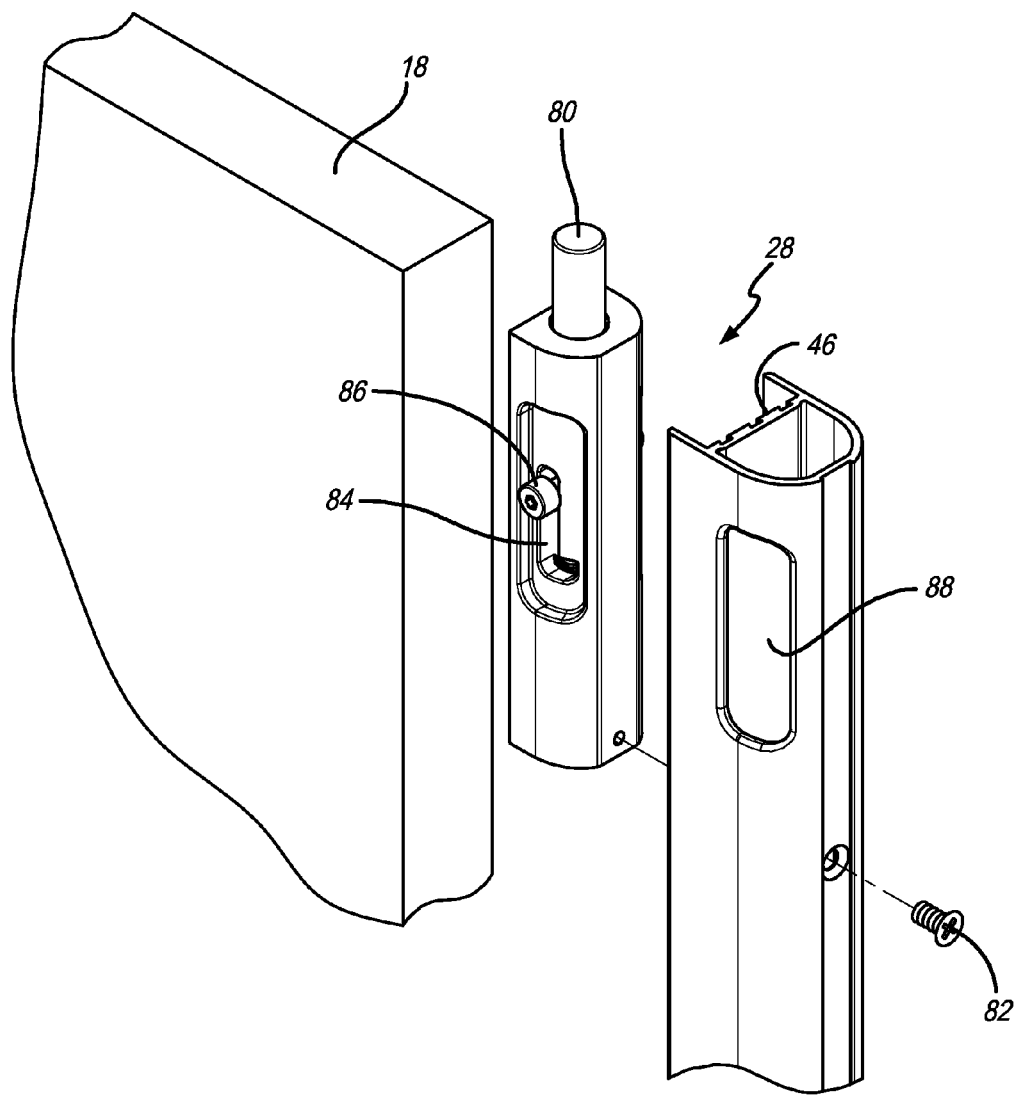
FIG. 8 is an exploded perspective view of the upper hinge assembly of the door module of FIG. 1.
Figure 9:
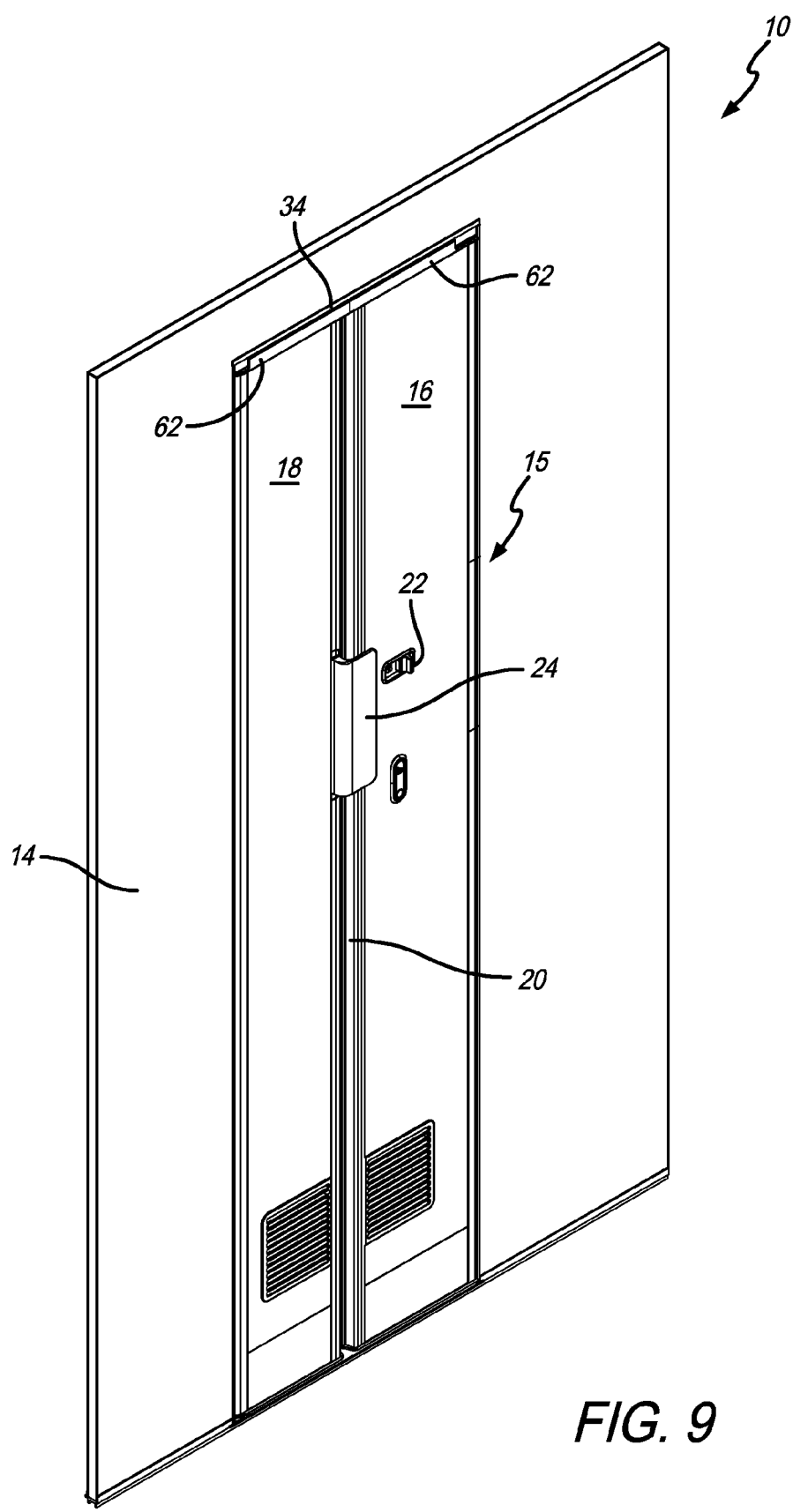
FIG. 9 is an inner perspective view of the door module of FIG. 1.
Figure 10:
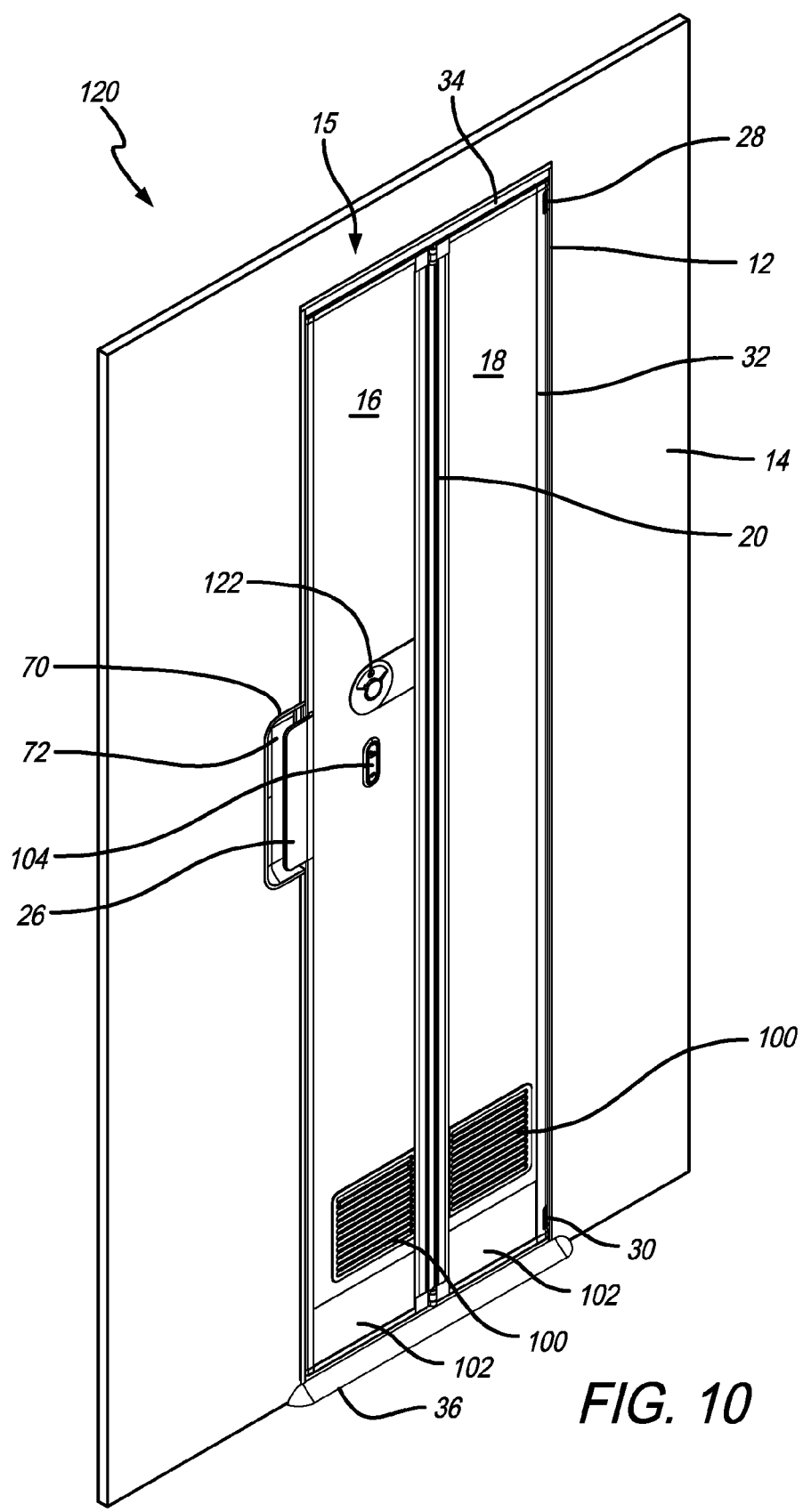
FIG. 10 is an outer perspective view of a door module and wall panel in accordance with a second preferred embodiment of the present invention.

As shown in FIGS. 7-8, in order to hingedly connect the trailing edge of the door 15 to the wall 14, the outer edge of the second panel 18 includes the edge cap 32 secured thereto. The edge cap includes a tunnel 78 extending therethrough and the upper hinge member 28 is positioned in the tunnel 78 such that an upper hinge pin 80 extends above the edge cap 32, and the lower hinge member 30 is positioned in the tunnel 78 such that a lower hinge pin 80 extends below the edge cap 32. The upper and lower hinge members 28 and 30 can be secured in the tunnel 78 by a screw 82, adhesive, other threaded fasteners or any other securing method.

In a preferred embodiment, the upper and lower hinge members 28 both include an L-slot 84 therein that includes a pin 86 that allows the spring biased hinge pin 80 to be moved axially. This allows the door to be secured to the frame or allows the door to be removed in case of an emergency. Preferably, the L-slot 84 and pin 86 are accessible via a window 88 defined in the edge cap 32.

FIGS. 10-18 show a door module 120 positioned within a door opening 12 in a wall 14. In a preferred embodiment, the door module 120 is used in an aircraft lavatory. However, this is not a limitation on the present invention and the door module 120 can be used in other locations. As shown in the drawings, in a preferred embodiment, the door module 120 generally includes a bi-fold door 15 that includes a first panel 16 and a second panel 18 that are secured together and pivotable with respect to one another via a central hinge 20. Preferably, the central hinge 20 is a living hinge (described below). However, this is not a limitation on the present invention and the center hinge can also be any other type of known hinge. The door module 120 also includes a latching assembly 122, an inner handle 24, an outer handle 26, upper and lower hinge members 28 and 30, a doorframe edge cap 32, header assembly 34, lower closeout 36, and upper and lower trim 128 and 130. The door module 120 can include other components known in the art such as vents 100, kick plates 102, an ashtray 104, door damper 106, etc.

Figure 11:
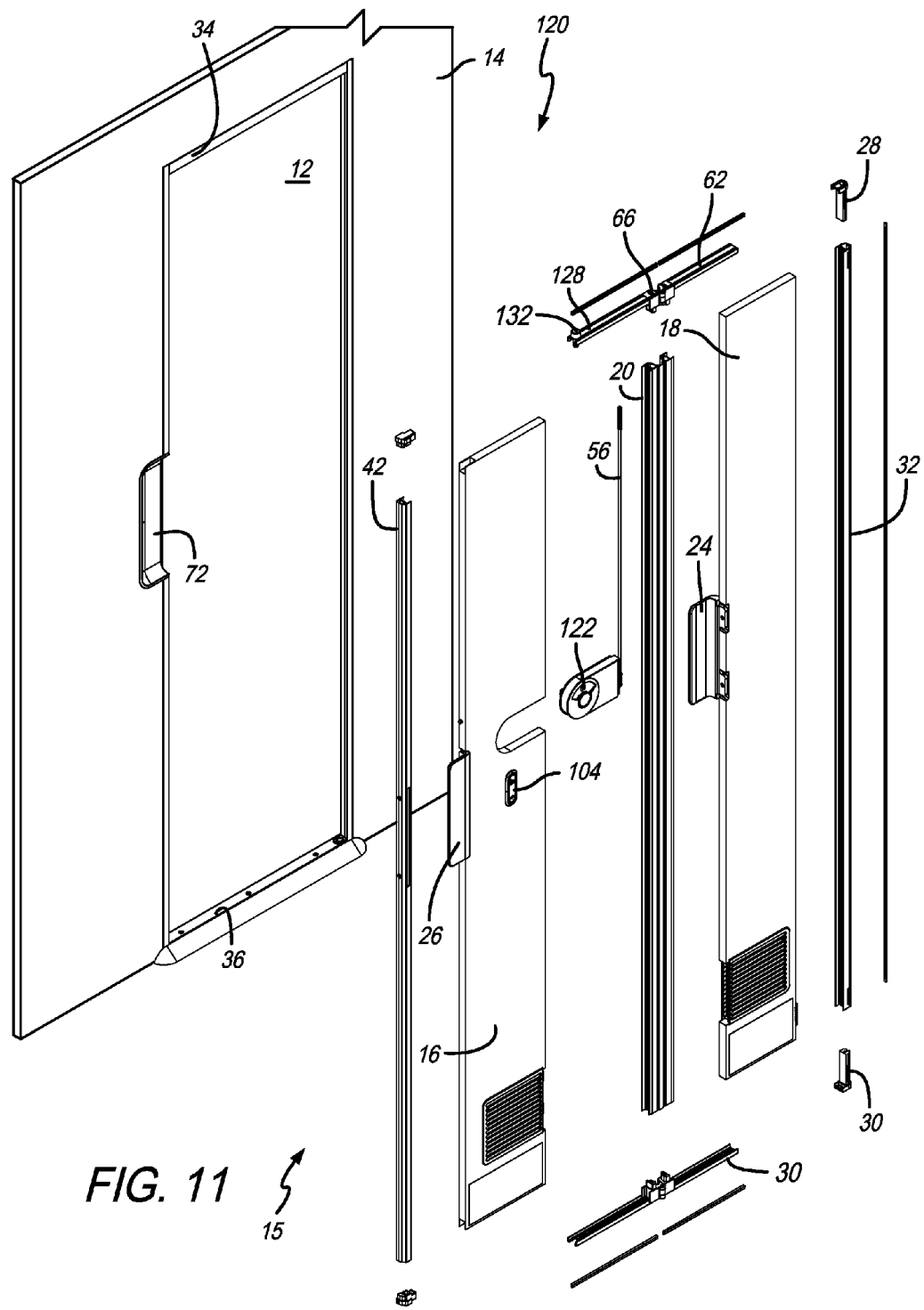
FIG. 11 is an exploded perspective view of the door module of FIG. 10.
Figure 12:
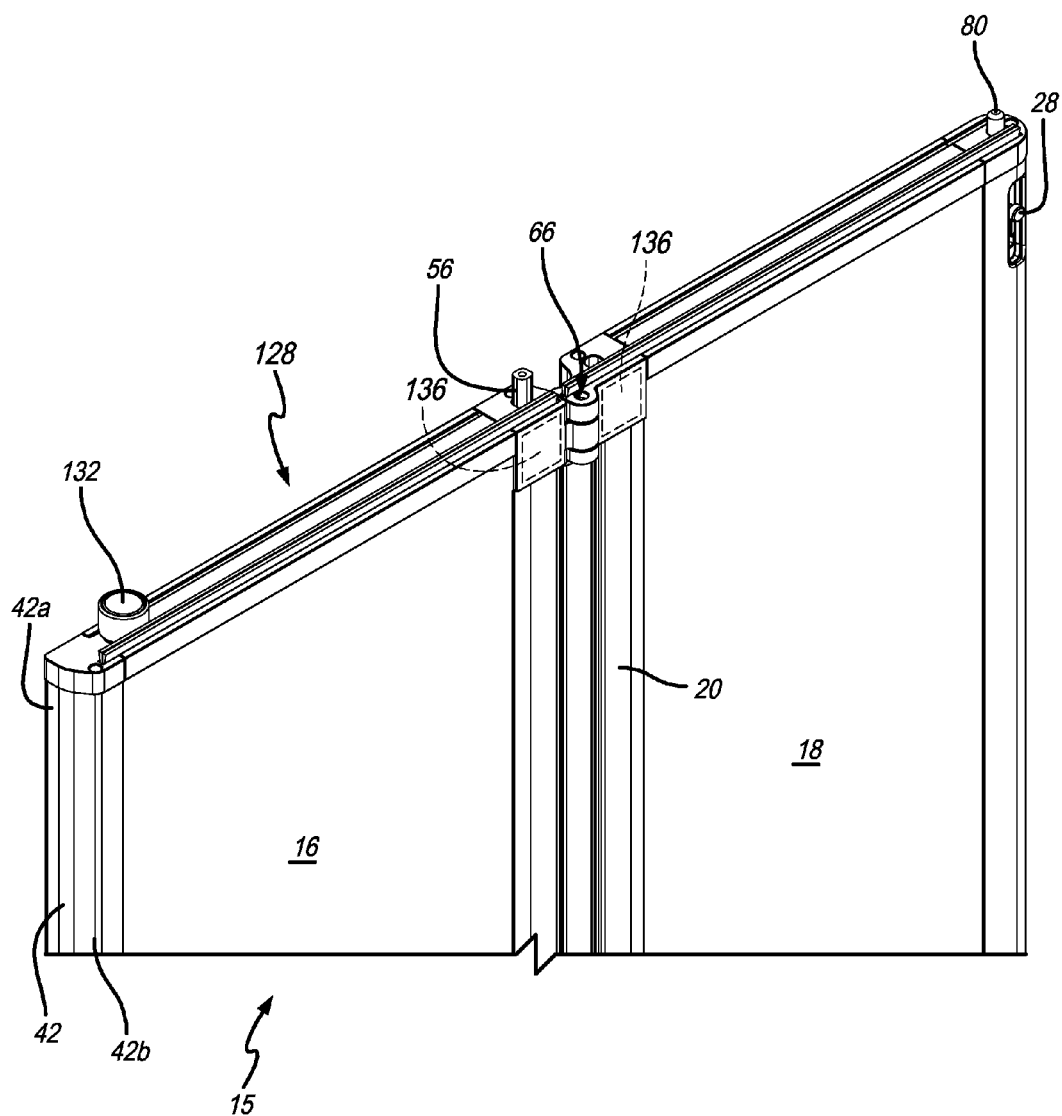
FIG. 12 is a perspective view of the top portion of the door module of FIG. 10.

As shown in FIGS. 11-12, in a preferred embodiment, the upper portion of the bi-fold door 15 includes a roller bearing 132 extending upwardly from the first panel 16 and the upper trim 128. The roller bearing 132 moves, slides or rolls within a track in the header assembly 34 that is secured to the lower edge of the door opening 12 in the wall 14. The roller bearing 132 is positioned such that when the bi-fold door 15 moves between the open and closed positions, the leading edge of the door moves in a path shown in FIG. 14 and discussed further below.

Figure 13:
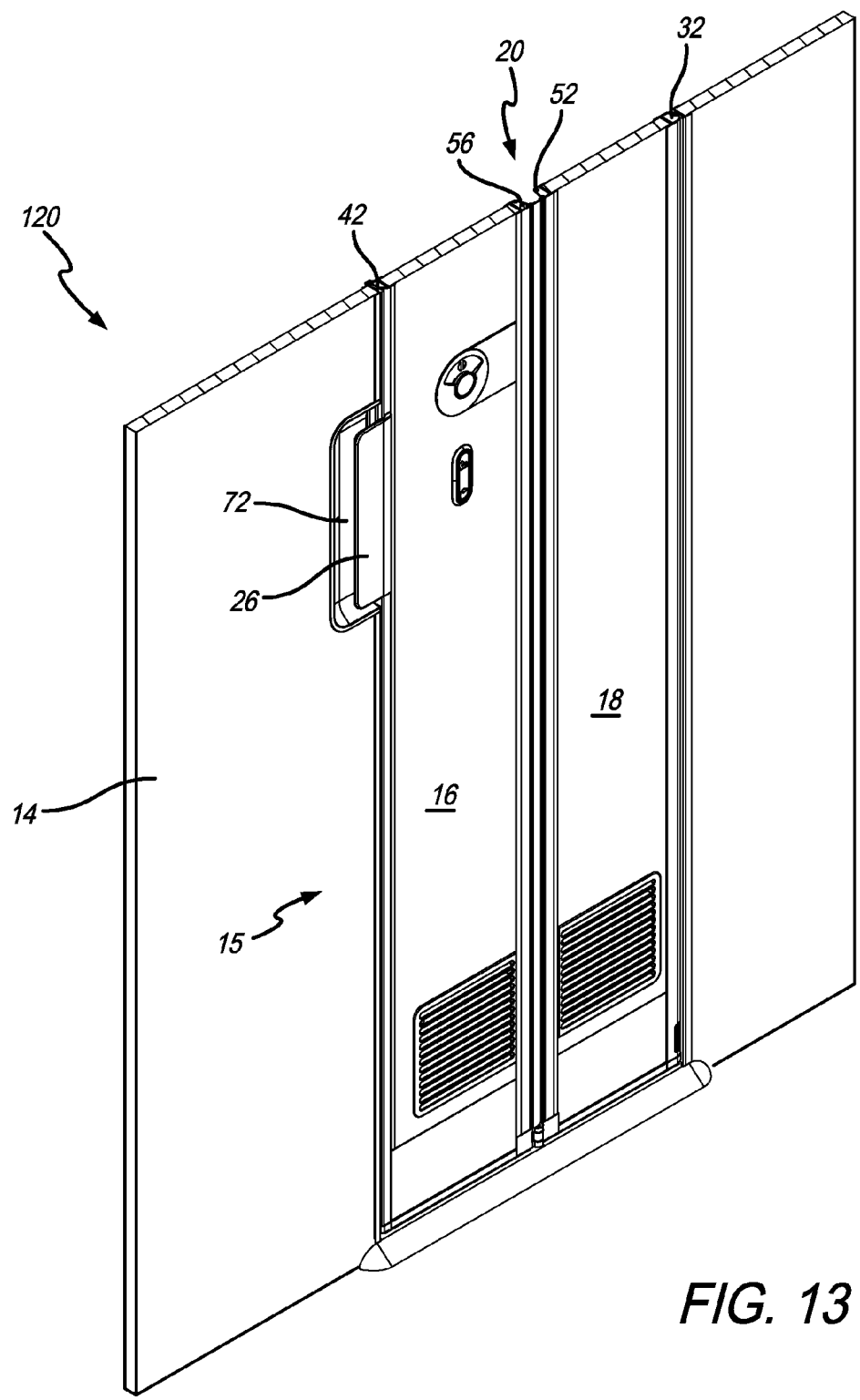
FIG. 13 is a cross-sectional perspective view of the top portion of the door module of FIG. 10.
Figure 14:
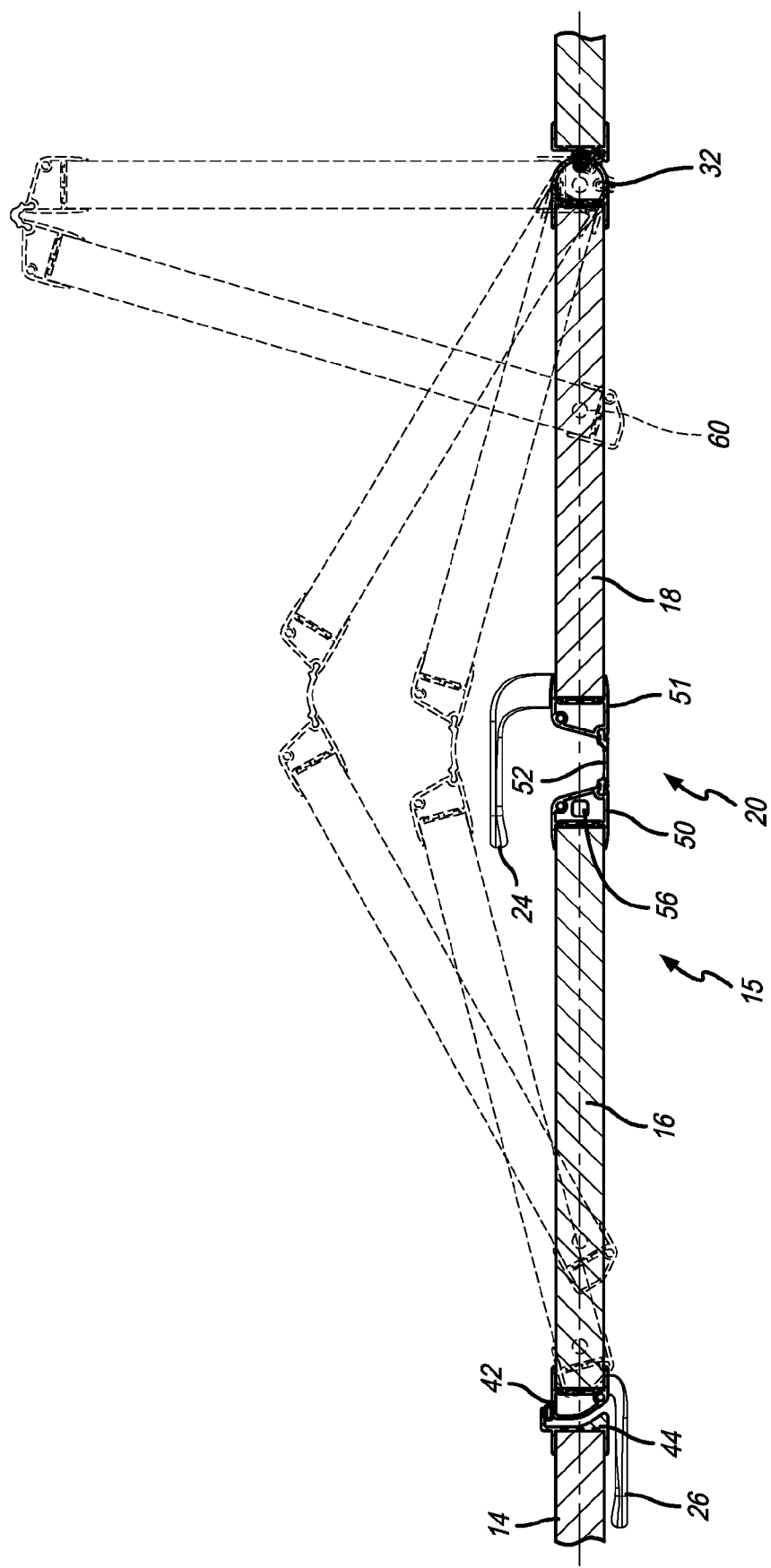
FIG. 14 is a cross-sectional plan view of the door module that shows the door moving between the open position and the closed position.
Figure 14A:
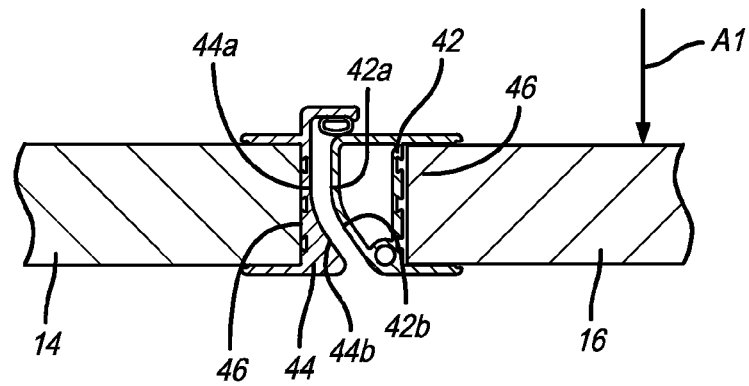
FIG. 14A is a detailed view of the interlocking feature of FIG. 14.

As shown in FIGS. 13-14A, in a preferred embodiment, the leading edge of the bi-fold door 15 interlocks or nests within the door jamb when the bi-fold door 15 is in the closed position. To accomplish this, the first panel 16 includes a first nesting member 42 secured thereon that interlocks with a second nesting member 44 that is secured to the wall 14. The first and second nesting members 42 and 44 can extend the entire height of the door 15 or, as shown in the drawings, there can be upper and lower portions that extend above and below the outer handle 26. The first and second nesting members 42 and 44 each include a channel 46 into which the first panel 16 or wall 14 are received. In a preferred embodiment, the first and second nesting members 42 and 44 are extrusions and are secured to (via adhesive, screws, fasteners, etc.) to the first panel 16 and wall 14. In another embodiment, the first nesting member can be integral with the first panel and the second nesting member can be integral with the wall.

It will be appreciated by those of ordinary skill in the art that the interlocking feature of the first and second nesting members helps prevent the door from being opened when the door (and, in particular, the first panel) is pushed from the inside (see arrow A1) in FIG. 14A. In a preferred embodiment, the first nesting member 42 includes a non-engagement portion or surface 42a and an engagement portion or surface 42b. The non-engagement portion 42a is generally parallel to the outer edge of the first panel 16 (or generally perpendicular to the front and back surfaces of the door). The engagement portion 42b curves or angles away from the non-engagement portion. The second nesting member 44 also includes a non-engagement portion 44a and an engagement portion 44b. The non-engagement portion 44a is generally parallel to the inner edge of the wall 14 (or generally perpendicular to the front and back surfaces of the wall), and is generally parallel to the non-engagement portion 42a of the first nesting member 42. The non-engagement portions can also be described as ramp portions. When a force is placed on the door 15 in the direction of arrow A1, the first panel 16 moves outwardly and engagement portion 42b contacts engagement portion 44b, thereby preventing the door from opening. Generally, the overlap between the first and second nesting members 42 and 44 in the lateral and/or transverse directions of the door 15 provides the interlocking capability. In other words, the profile of the leading edge of the door and the mating part on the wall or structure are shaped in a fashion that they will securely retain the door from any inboard outboard movement. They also eliminate any direct line of site through the gaps, preventing any unwanted light bleed and privacy issues.

It will be appreciated that the path traveled by the leading edge of the door, as a result of the interaction between roller bearing 132 and its track is what allows the first and second nesting members 42 and 44 to nest. This path is shown in FIG. 14 with reference to the various positions of the door shown in hidden lines and the path the roller bearing 132 must travel within the track.

Figure 14B:
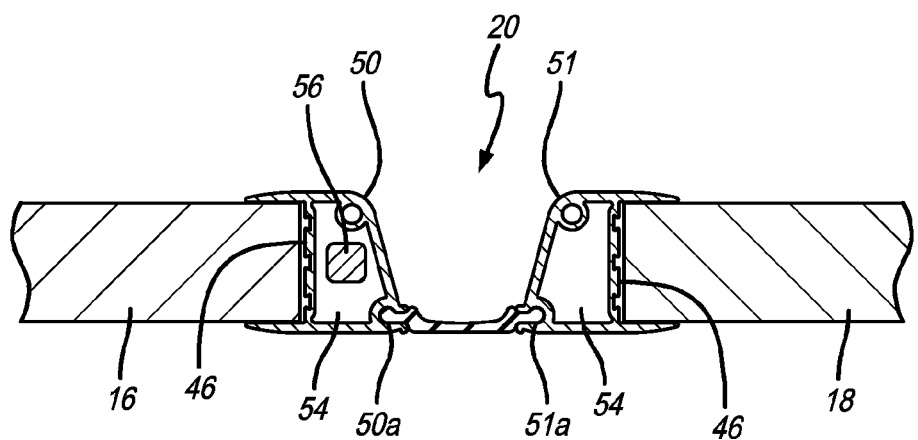
FIG. 14B is a detailed view of the living hinge of FIG. 14.

As shown in FIGS. 13 and 14B, in a preferred embodiment, the central hinge 20 is or includes a living hinge that connects the first and second panels 16 and 18. In a preferred embodiment, the living hinge includes a hinge member 52 that extends between first and second securing members 50 and 51. The first securing member 50 extends along and is attached to an inner edge of the first panel 16 and the second securing member 51 extends along and is attached to an inner edge of the second panel 18. The hinge member 52 includes opposite edges that are captured in grooves 50*a* and 51*a* defined in the first and second securing members 50 and 51. In a preferred embodiment, the hinge member 52 is made of a material that provides hinging or pivot capability, and also allows it to be biased toward the closed position (thereby making it easier for a user to close the door). For example, the hinge member 52 can be made of an elastomeric material or the like.

Preferably, the first and second securing members 50 and 51 each include a cavity or tunnel 54 extending therethrough. Furthermore, as described below, an elongated bolt 56 that is operationally associated with the latching assembly 122 extends through and is movable within the tunnel 54 of the one or the other of the first and second securing members 50 and 51.

In a preferred embodiment, the latching assembly 22 is positioned in the first panel and operates the elongated locking bolt 56. Preferably, the first securing member includes a latch opening 58 defined therein that is in communication with the tunnel 54, and a portion of the latching assembly 122 extends through the latch opening 58 and into the tunnel 54. In a preferred embodiment, the central hinge 20 includes a fixed hinge, pivot point or knuckle 134 at the top and bottom thereof. The fixed hinge can be part of the upper trim 38 and captures and secures the top of the living hinge (the same is at the bottom). In a preferred embodiment, the fixed hinge 66 includes magnets 136 embedded are positioned on opposite sides of the hinge (e.g. one on first panel 16 and one on second panel 18) that are magnetically attracted to one another. This helps finish the closing of the door when it is moved to the closed position.

As shown in FIG. 11, in a preferred embodiment, the latching assembly 122 includes or interacts with an elongated bolt or locking mechanism 56. The single action bolt runs through the tunnel or cavity in the first securing member of the central hinge extrusion and extends through an opening in the upper trim 38. The top of the bolt moves between a released and locking position. In the locking position, the bolt extends into a receptacle or the like in the header assembly 34, wall or structure, thereby preventing the door 15 from being opened. The drawings show a latching assembly or mechanism 122 that is operated by a user by rotating a handle or other user interface member, which in turn moves the bolt 56 up and down. The latching assembly 122 translates rotational motion to linear/vertical motion. However, in another embodiment, the latching assembly can be operated in a vertical manner. In another embodiment, the latching mechanism can move a bolt that interacts horizontally with the vertical edge of the wall 14. By bolting the panel or blade of the bi-fold door 15 to the header 34, and in conjunction with the interlocking leading edge, the door is securely locked.

Figure 15:
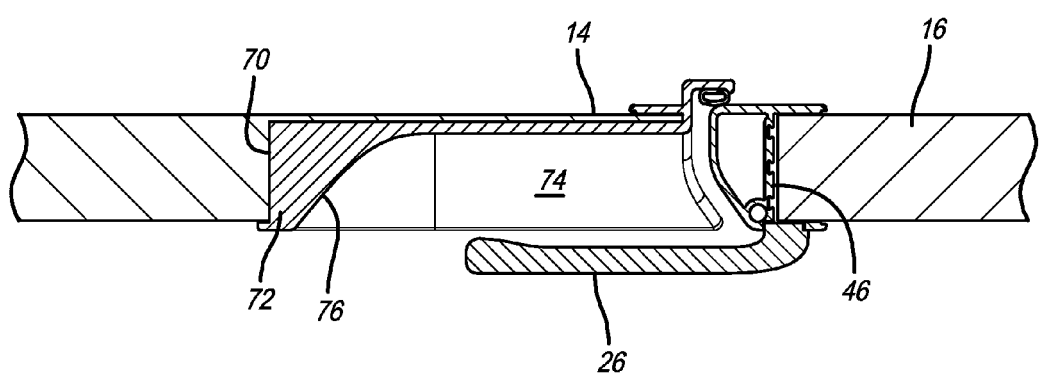
FIG. 15 is a cross-sectional plan view of the outer handle.

As shown in FIG. 14-15, in a preferred embodiment, the door 15 includes the outer paddle handle 26 that is secured to and extends outwardly from the first panel 16 such that it overlaps at least a portion of the wall 14. Preferably, the door 15 also includes the inner paddle handle 24 that is secured to the second panel 18 and overlaps at least a portion of the first panel 16. In another embodiment, the inner paddle handle 24 can be secured to the first panel 16 and overlap at least a portion of the second panel 16. The positioning of the handles makes it intuitive for someone inside or outside the bathroom as to where and how to pull on the handle. As shown in FIG. 11, in a preferred embodiment, the wall 14 includes a handle indentation 70 defined therein that includes an insert 72 positioned therein. The outer paddle handle 26 overlaps and cooperates with the handle indentation 70 and the insert 72 to define an opening space 74. Preferably, the insert 72 includes a ramp portion 76 leading into and partially defining the opening space 74.

Figure 16:
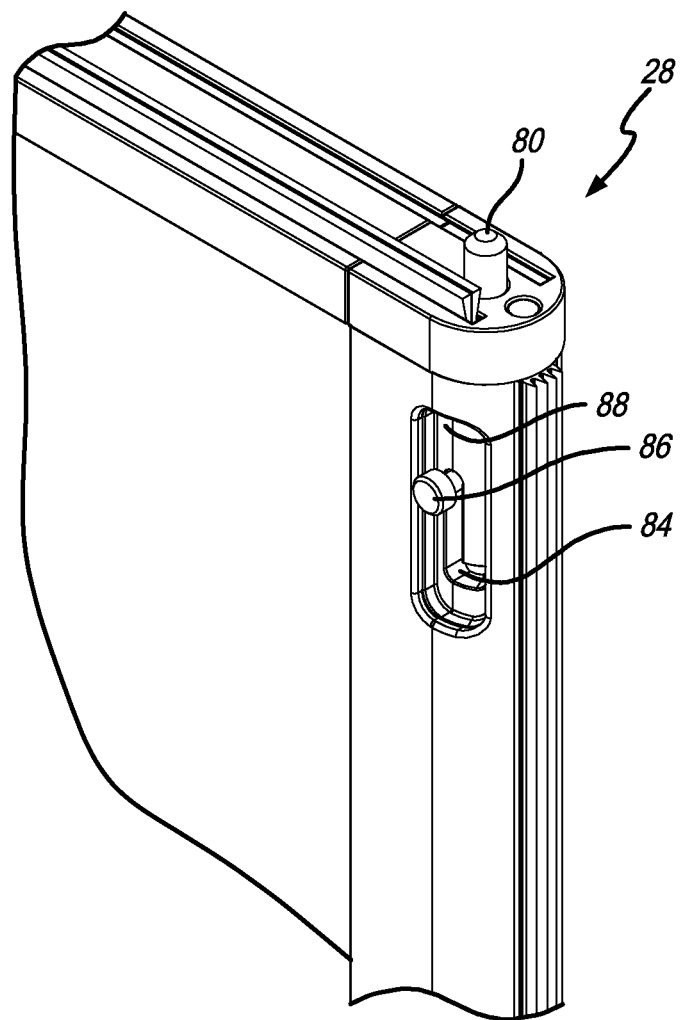
FIG. 16 is a perspective view of the upper hinge assembly of the door module of FIG. 10.
Figure 17:
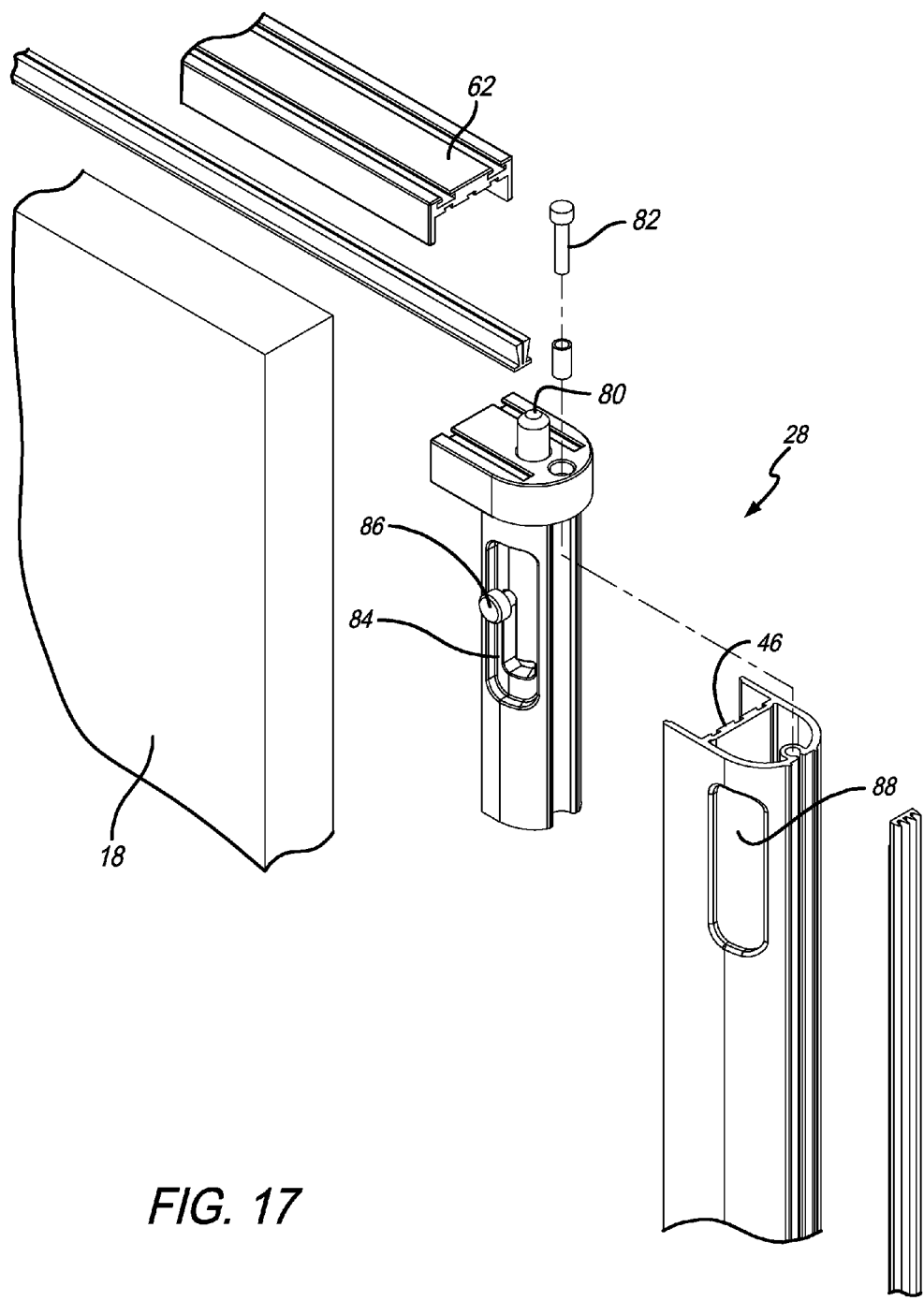
FIG. 17 is an exploded perspective view of the upper hinge assembly of the door module of FIG. 10.
Figure 18:
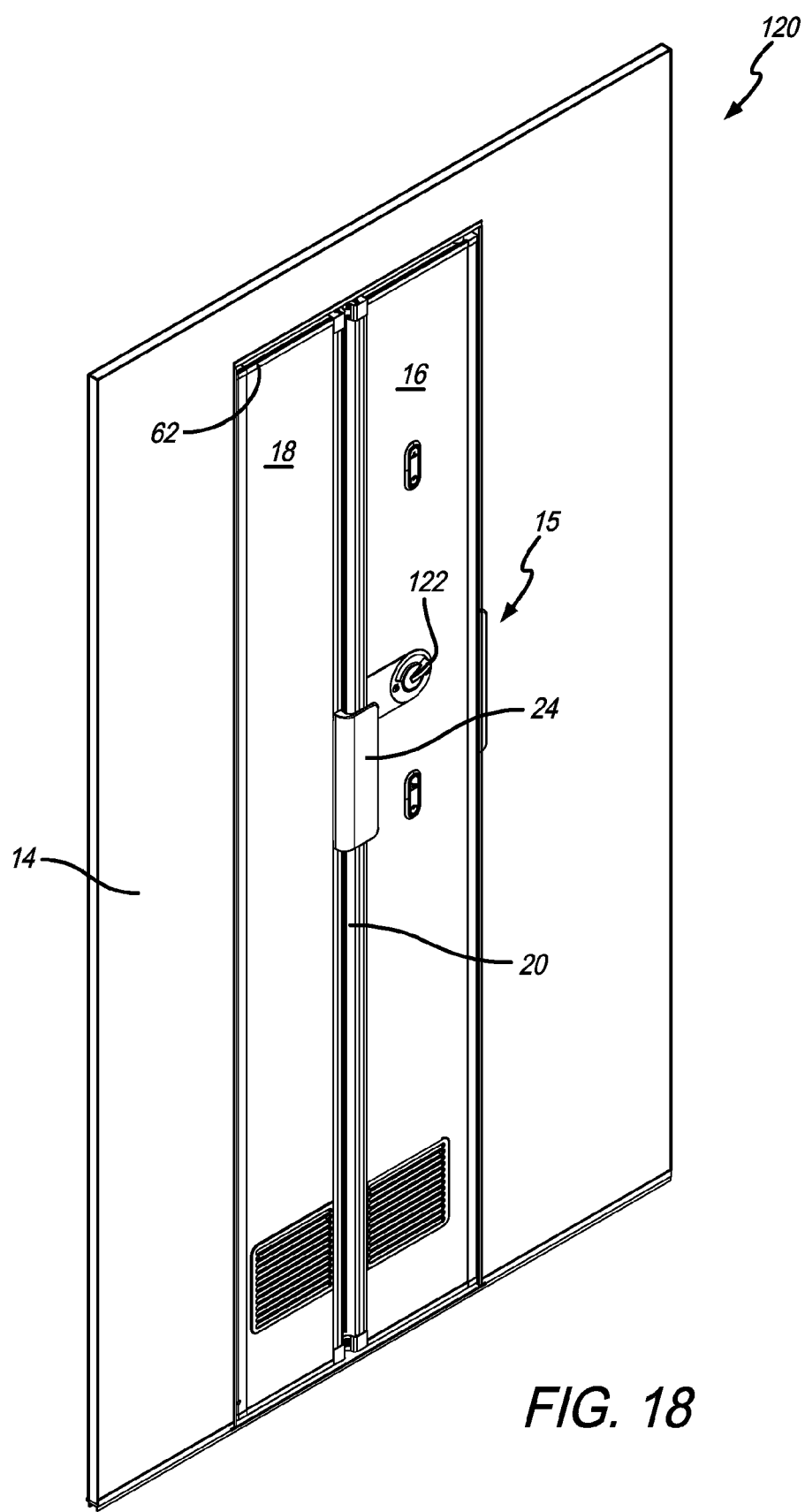
FIG. 18 is an inner perspective view of the door module of FIG. 10.

As shown in FIGS. 16-17, in order to hingedly connect the trailing edge of the door 15 to the wall 14, the outer edge of the second panel 18 includes the edge cap 32 secured thereto. The edge cap includes a tunnel 78 extending therethrough and the upper hinge member 28 is positioned in the tunnel 78 such that an upper hinge pin 80 extends above the edge cap 32, and the lower hinge member 30 is positioned in the tunnel 78 such that a lower hinge pin 80 extends below the edge cap 32. The upper and lower hinge members 28 and 30 can be secured in the tunnel 78 by a screw 82 that is received in an opening 138 formed in the top of the edge cap 32. The opening 138 can extend the length of the edge cap 32 and a screw can be used to secure the lower hinge member 30 in place. As shown in FIGS. 14A and 14B, similar openings 138 can be included in the first and second securing members 50 and 51 and the first nesting member 42 for securing these components at the top and bottom thereof.

In a preferred embodiment, the upper and lower hinge members 28 and 30 both include an L-slot 84 therein that includes a pin 86 that allows the spring biased hinge pin 80 to be moved axially. This allows the door to be secured to the frame or allows the door to be removed in case of an emergency. Preferably, the L-slot 84 and pin 86 are accessible via a window 88 defined in the edge cap 32.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A door module for a vehicle lavatory, the door module comprising:
    a bi-fold door that includes a first panel and a second panel each having an inner surface and an outer surface and pivotably connected together by a living hinge, wherein the living hinge includes a hinge member that extends between first and second securing members, wherein the first securing member extends along and is attached to an inner edge of the first panel and the second securing member extends along and is attached to an inner edge of the second panel, wherein the bi-fold door is movable between a closed and an open position, wherein the hinge member bends when the bi-fold door moves from the closed position to the open position, wherein the living hinge includes a fixed hinge at a top thereof that secures the top of the living hinge.

2. The door module of claim 1 wherein an outer edge of the second panel includes an edge cap secured thereto, wherein the edge cap includes a tunnel extending therethrough, wherein an upper hinge member is positioned in the tunnel such that an upper hinge pin extends above the edge cap, and wherein a lower hinge member is positioned in the tunnel such that a lower hinge pin extends below the edge cap.

3. The door module of claim 1 wherein the bi-fold door includes upper trim, and wherein the fixed hinge is a part of the upper trim.

4. The door module of claim 3 wherein the living hinge includes first and second magnets on opposite sides thereof.

5. A door module for a vehicle lavatory, the door module comprising:
    a bi-fold door that includes a first panel and a second panel each having an inner surface and an outer surface and pivotably connected together by a living hinge, wherein the living hinge includes a hinge member that extends between first and second securing members, wherein the first securing member extends along and is attached to an inner edge of the first panel and the second securing member extends along and is attached to an inner edge of the second panel, and
    a latching assembly positioned in the first panel, wherein the latching assembly operates an elongated locking bolt, wherein the first securing member includes a first tunnel defined therein, and wherein the locking bolt extends through and above the first tunnel.

6. The door module of claim 5, wherein the first securing member includes a latch opening defined therein that is communication with the first tunnel, and wherein a portion of the latching assembly extends through the latch opening and into the first tunnel.

7. A door module for a vehicle lavatory, the door module comprising:
    a bi-fold door that includes a first panel and a second panel each having an inner surface and an outer surface and pivotably connected together by a central hinge, wherein the bi-fold door is positioned in a door opening that is defined in a wall and is moveable between a closed position and an open position, wherein an outer edge of the first panel includes a first nesting member thereon, wherein an inner edge of the wall adjacent the outer edge of the first panel includes a second nesting member thereon, and wherein at least a portion of the first and second nesting members overlap in a transverse direction when the bi-fold door is in the closed position, wherein the first nesting member includes an inner wall and an outer wall, and wherein the inner wall extends further from the first panel than the outer wall does.

8. The door module of claim 7 wherein the first nesting member includes a non-engagement portion and an engagement portion, wherein the second nesting member includes a non-engagement portion and an engagement portion, whereby when a force is placed on the inner surface of the first panel, the engagement portion of the first nesting member contacts the engagement portion of the second nesting member to prevent the bi-fold door from opening.

9. The door module of claim 7 wherein the non-engagement portion of the first nesting member is generally parallel to the outer edge of the first panel, and wherein the non-engagement portion of the second nesting member is generally parallel to the inner edge of the wall.

10. A door module for a vehicle lavatory, the door module comprising:
    a bi-fold door that includes a first panel and a second panel each having an inner surface and an outer surface and pivotably connected together by a central hinge, wherein the bi-fold door is positioned in a door opening that is defined in a wall and is moveable between a closed position and an open position, wherein an outer paddle handle is secured to and extends outwardly from the first panel such that it overlaps at least a portion of the wall, wherein the outer paddle handle has an inner surface that is in communication with an exterior of the wall when the bi-fold door is in a closed position such that a user can grasp the inner surface.

11. The door module of claim 10 wherein an inner paddle handle is secured to the second panel and overlaps at least a portion of the first panel.

12. The door module of claim 10 wherein the wall includes a handle indentation defined therein, wherein the outer paddle handle overlaps and cooperates with the handle indentation to define an opening space, wherein the opening space is defined between an outer surface of the handle indentation and the opposing inner surface of the outer paddle handle.

13. The door module of claim 12 wherein an insert is positioned in the handle indentation, and wherein the insert includes a ramp portion leading into and partially defining the opening space.

14. A door module for a vehicle lavatory, the door module comprising:
a wall that includes a door opening defined therein,
a bi-fold door positioned in the door opening and moveable between a closed position and an open position, wherein the bi-fold door includes a first panel and a second panel each having an inner surface and an outer surface and pivotably connected together by a living hinge, wherein the living hinge includes a hinge member that extends between first and second securing members, wherein the first securing member extends along and is attached to an inner edge of the first panel and the second securing member extends along and is attached to an inner edge of the second panel, wherein the hinge member includes opposite edges, wherein the first and second securing members each include an elongated groove defined therein, wherein the elongated grooves capture the opposite edges of the hinge member, wherein an outer paddle handle is secured to and extends outwardly from the first panel such that it overlaps at least a portion of the wall, wherein the outer paddle handle has an inner surface that is in communication with an exterior of the wall when the bi-fold door is in a closed position such that a user can grasp the inner surface, and wherein an inner paddle handle is secured to the second panel and overlaps at least a portion of the first panel.

15. The door module of claim 14 wherein the wall includes a handle indentation defined therein, and wherein the outer paddle handle overlaps and cooperates with the handle indentation to define an opening space.

16. The door module of claim 14 further comprising a latching assembly positioned in the first panel, wherein the latching assembly operates an elongated locking bolt, wherein the first securing member includes a first tunnel defined therein, and wherein the locking bolt extends through and above the first tunnel.

17. The door module of claim 14 wherein an outer edge of the second panel includes an edge cap secured thereto, wherein the edge cap includes a tunnel extending therethrough, wherein an upper hinge member is positioned in the tunnel such that an upper hinge pin extends above the edge cap, and wherein a lower hinge member is positioned in the tunnel such that a lower hinge pin extends below the edge cap.

18. The door module of claim 14 wherein an outer edge of the first panel includes a first nesting member thereon, wherein an inner edge of the wall adjacent the outer edge of the first panel includes a second nesting member thereon, and wherein at least a portion of the first and second nesting members overlap in a transverse direction when the bi-fold door is in the closed position, wherein the first nesting member includes an inner wall and an outer wall, and wherein the inner wall extends further from the first panel than the outer wall does.

19. The door module of claim 18 wherein in the closed position the hinge member includes outwardly facing opposite edges, wherein the first and second securing members each include an inwardly facing elongated groove defined therein, and wherein the elongated grooves capture the opposite edges of the hinge member, and wherein the elongated grooves oppose one another.

20. The door module of claim 18 wherein the first nesting member includes a non-engagement portion and an engagement portion, wherein the second nesting member includes a non-engagement portion and an engagement portion, whereby when a force is placed on the inner surface of the first panel, the engagement portion of the first nesting member contacts the engagement portion of the second nesting member to prevent the bi-fold door from opening.

21. The door module of claim 20 wherein the non-engagement portion of the first nesting member is generally parallel to the outer edge of the first panel, and wherein the non-engagement portion of the second nesting member is generally parallel to the inner edge of the wall.

\* \* \* \* \*